United States Patent [19]

Takayama et al.

[11] Patent Number: 4,669,005

[45] Date of Patent: May 26, 1987

[54] REPRODUCING APPARATUS

[75] Inventors: Nobutoshi Takayama; Kouji Takahashi, both of Kanagawa, Japan

[73] Assignee: Canon Kabushiki Kaisha, Tokyo, Japan

[21] Appl. No.: 765,331

[22] Filed: Aug. 13, 1985

[30] Foreign Application Priority Data

Aug. 17, 1984 [JP]  Japan .................................. 59-170346

[51] Int. Cl.$^4$ .............................................. G11B 5/56
[52] U.S. Cl. ...................................................... 360/77
[58] Field of Search ......................................... 360/77

[56] References Cited

U.S. PATENT DOCUMENTS 4,237,500 12/1980 Sanderson ............................. 360/77
4,530,012 7/1985 Kinjo ..................................... 360/77
4,544,966 10/1985 Taniguchi et al. ..................... 360/77

*Primary Examiner*—George G. Stellar

*Attorney, Agent, or Firm*—Toren, McGeady and Goldberg

[57] ABSTRACT

An apparatus for reproducing information signals from a record bearing medium having the information signals recorded together with different pilot signals which are repeatedly recorded, one after another, in a plurality of recording tracks. The apparatus includes a reproducing device arranged to trace the recording tracks on the record bearing medium; a reference signal generating device for generating reference signals which have frequencies corresponding to the pilot signals; a detection signal generating device for generating a plurality of detection signals having different frequency components by using the pilot signals reproduced by the reproducing device and the reference signals; and a tracking error signal generating device for generating a tracking error signal by utilizing the different frequency components of the detection signals.

24 Claims, 4 Drawing Figures

REPRODUCING APPARATUS

BACKGROUND OF THE INVENTION

1. Field of the Invention

This invention relates to a reproducing apparatus adapted for reproducing information signals from a record bearing medium having a plurality of recording tracks in which the information signals are recorded.

2. Description of the Prior Art

Information signal reproducing apparatuses include a kind arranged to bring a reproducing head onto a recording track by using a pilot signal reproduced by the reproducing head from a record bearing medium on which a plurality of pilot signals of different frequencies are cyclically recorded in the recording tracks together with information signals. For the reproducing apparatus of this kind, there have been known various methods for setting the plurality of pilot signals. An example of such methods is called a four frequency method. This method is as described below with reference to the accompanying drawings:

FIG. 1 shows reproducing heads of a conventional video tape recorder (VTR for short) in a state of tracing the recording tracks of a record bearing medium T on which a video signal is recorded together with pilot signals of four different frequencies f1, f2, f3 and f4. The illustration includes also cross-talk signals coming from adjacent tracks on the left and right sides of each mainly traced track. FIG. 2 is a block diagram showing the essential arrangement of the tracking control circuit of the same VTR. The frequencies f1, f2, f3 and f4 are arranged such that a frequency difference between any two of the four different pilot signals is either $\Delta fa$ or $\Delta fb$. In other words, a reference signal which is generated by a reference signal oscillator 127 (OSC for short) is frequency divided, by frequency dividers 101, 102, 103 and 104, each having a different frequency dividing ratio. A switch 109 has four terminals which are arranged to receive signals of frequencies f1, f2, f3 and f4 obtained by allowing the frequency divided reference signals to pass through band-pass filters 105, 106, 107 and 108 having the frequencies f1, f2, f3 and f4 at the centers of their pass bands, respectively. These frequencies are set within a frequency band lower than that of the video signal. The switching operation of the switch 109 is arranged to be performed in a cyclic manner at every rise and fall of a rectangular wave signal (hereinafter referred to as the 30 PG signal) which is in synchronism with the rotating period of rotary heads 100a and 100b. More specifically, the use of the rotary heads 100a and 100b is changed over by a head switching circuit 123 in synchronism with the 30 PG signal in such a manner as 100a→100b→100a→100b→100a.... Then, also in synchronism with the 30 PG signal, the switch 109 shifts its output in such a manner as the signals of frequencies f1→f2→f3→f4→f1→.... The above-stated 30 PG signal is produced from a 30 PG signal oscillator 125 in synchronism with the rotating period of the heads 100a and 100b, which is detected by a detector 124.

During a recording operation, the signals of frequencies f1, f2, f3 and f4 are frequency mixed at a mixing circuit 129 with the video signal which has been processed by a signal processing circuit 130 for recording. The frequency mixed signal thus obtained is amplified by a recording amplifier 131 before being supplied to the rotary heads 100a and 100b through a recording/reproduction change-over switch 128.

At the time of reproduction, the signals of frequencies f1, f2, f3 and f4 are reproduced by the rotary heads through the head switching circuit 123 in synchronism with the 30 PG signal from a magnetic tape 126 which is used as the record bearing medium and has the video signal together with the signals of frequencies f1, f2, f3 and f4 thereon. A reproduction signal thus obtained is supplied to an amplifier 110 through the recording/reproduction change-over switch 128. Then, a frequency component including the band of the video signal is separated by a high-pass filter (HPF) 132 and is supplied to a signal processing circuit 133. The circuit 133 then performs a reproduction signal processing operation on this frequency component and produces it as a reproduced video signal. Meanwhile, another frequency component including the frequencies f1, f2, f3 and f4 is separated through a low-pass filter (LPF) 111 and is supplied to a multiplier 112. The multiplier 112 multiplies the output signal of the LPF 111 by reference signals of frequencies f1, f2, f3 and f4 which are cyclically supplied via a switch 109. The multiplier 112 thus produces signals including the frequency difference components $\Delta fa$ and $\Delta fb$. The frequency components included in the signals $\Delta fa$ and $\Delta fb$ are obtained from the following relation (wherein f1 < f2 < f4 < f3):

$$|f1-f2| = \Delta fa$$

$$|f2-f3| = \Delta fb$$

$$|f3-f4| = \Delta fa$$

$$|f4-f1| = \Delta fb$$

To extract the difference frequencies $\Delta fa$ and $\Delta fb$, the tracking control circuit is provided with band-pass filters 113 and 114 and detectors 115 and 116, for these difference frequencies $\Delta fa$ and $\Delta fb$. Then an output level difference between the two difference frequencies becomes zero, the reproducing head 100 is considered to be accurately tracing the recording track, that is, the head is considered to be in an on-track state. For this purpose, the output level difference between the difference frequencies $\Delta fa$ and $\Delta fb$ are detected by means of a differential amplifier 117 and, as a result of this, a tracking error signal voltage $E_0$ is obtained.

Again referring to FIG. 1, hatched parts indicate that the positions of the difference frequencies $\Delta fa$ and $\Delta fb$ relative to the reproducing head are interchanging every time the positions of the heads shift from one track to another. Therefore, in order to detect the deviating (or error) direction of the rotary heads 100a and 100b, the positive and negative polarities of the phase of the above-stated error signal voltage $E_0$ must be inverted in synchronism with the above-stated rectangular wave signal (or 30 PG signal) which is synchronized with the rotation of the heads. The inverting operation is performed by the combination of an inverter 118 and an electronic switch 119 which are shown in FIG. 2 to obtain an error signal voltage $E_1$. The error signal voltage $E_1$ includes the direction of the error and the extent of the deviation. Further, a control voltage $E_2$ which is required for driving a capstan motor 122 at a constant speed is added to the error voltage $E_1$ by an adder 121 to obtain a tracking control signal voltage $E_3$. This control signal voltage $E_3$ is used to control the motor 122.

However, since the conventional apparatus described in the foregoing is arranged to perform error detection by obtaining the control signal voltage from two different frequencies, the circuit arrangement of the apparatus becomes complex.

SUMMARY OF THE INVENTION

It is an object of this invention to provide a reproducing apparatus which solves the above-stated problems of the prior art and is capable of adequately performing tracking control despite using a simple structural arrangement thereof.

It is another object of this invention to provide a reproducing apparatus which not only permits simplification of circuit arrangement without lowering the degree of tracking precision, but also permits simplification of various adjustment mechanisms, etc.

Under that object, a reproducing apparatus arranged, according to this invention as an embodiment thereof, to reproduce information signals from a record bearing medium having the information signals recorded in a plurality of recording tracks together with different pilot signals which are recurrently recorded one after another on the record bearing medium comprises:

reproducing means arranged to trace the recording tracks on the record bearing medium; reference signal generating means for generating reference signals which have frequencies corresponding to the pilot signals; detection signal generating means for generating a plurality of detection signals having different frequency components by using the pilot signals reproduced by the reproducing means and the reference signals; and tracking error signal generating means for generating a tracking error signal by using one of the different frequency components of the detection signals.

The reproducing apparatus which is arranged as described above permits simplification of circuit arrangement and also obviates the necessity of adjustment of various kinds.

These and further objects and features of this invention will become apparent from the following detailed description of a preferred embodiment thereof taken in connection with the accompanying drawings.

DETAILED DESCRIPTION OF THE PREFERRED EMBODIMENT

The following describes this invention through a preferred embodiment thereof with reference to the accompanying drawings: In this embodiment, the invention is applied to a VTR as one of reproducing apparatuses of the kind arranged to reproduce information signals from a record bearing medium which has pilot signals of four different frequencies f1, f2, f3 and f4 recorded along with the information signals as shown in FIG. 1.

Referring again to FIG. 1, either a difference frequency $\Delta fa$ or another difference frequency $\Delta fb$ is obtained without fail from a pilot signal reproduced from one of the two adjacent recording tracks every time one track is traced by the rotary head. Further, the difference frequency is obtained from the adjacent track alternately on the left side and the right side of the tracing locus of the rotary head. In addition to that, the tracing condition of the rotary head hardly varies for two adjacent tracks and as such, a tracking error voltage obtained from one track is similar to another tracking error voltage obtained from the next one.

In view of this characteristic the specific embodiment of the invention is arranged to obtain only the tracking error voltage of one of the two difference frequencies for the purpose of simplifying circuit arrangement.

Figures 1, 2:
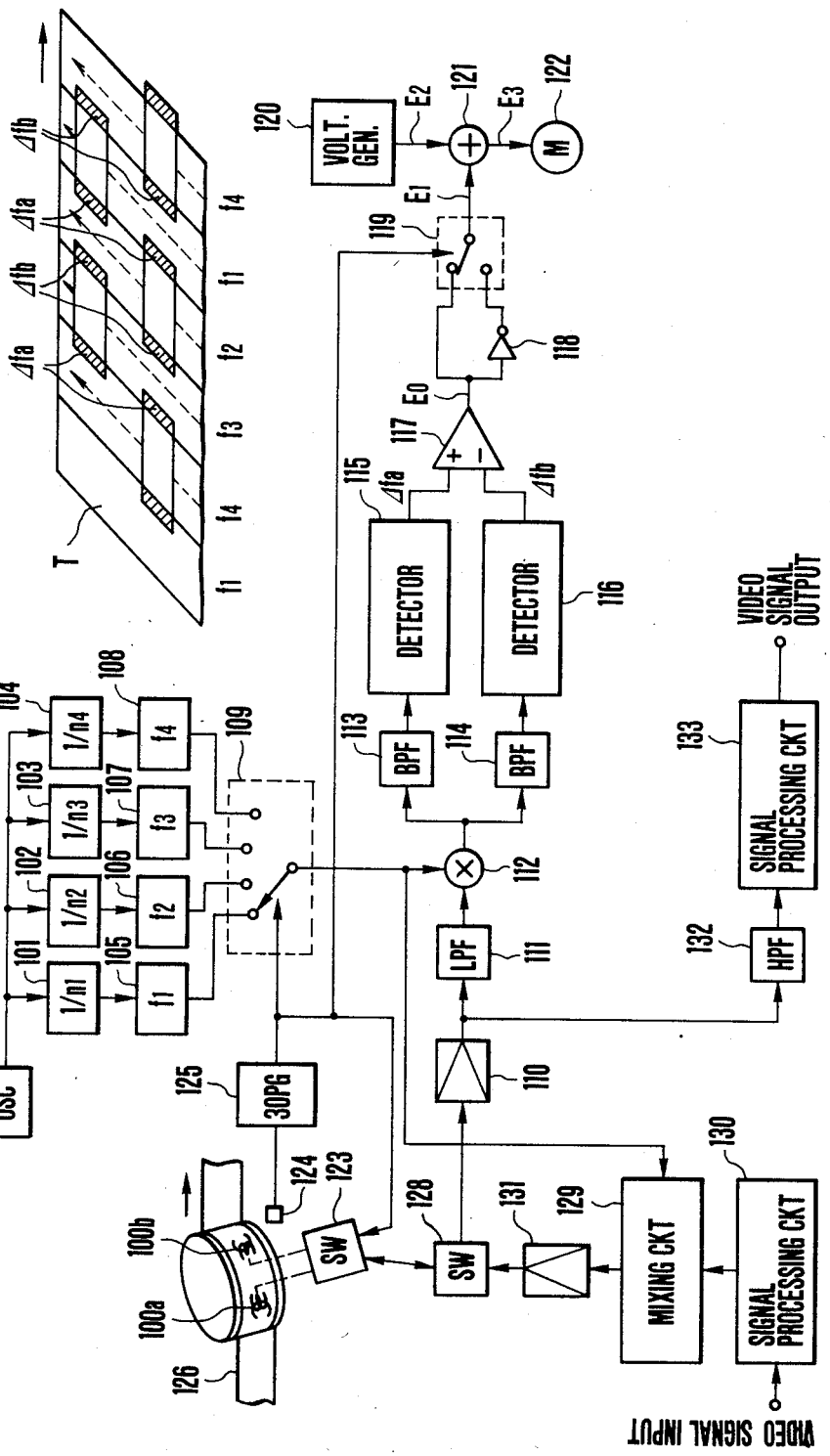
FIG. 1 shows the tracing loci of rotary heads in relation to the recording tracks of a magnetic tape in which pilot signals of four different frequencies are recorded together with information signals.
FIG. 2 is a block diagram showing the arrangement of a tracking control system employed in the conventional VTR.
Figure 3:
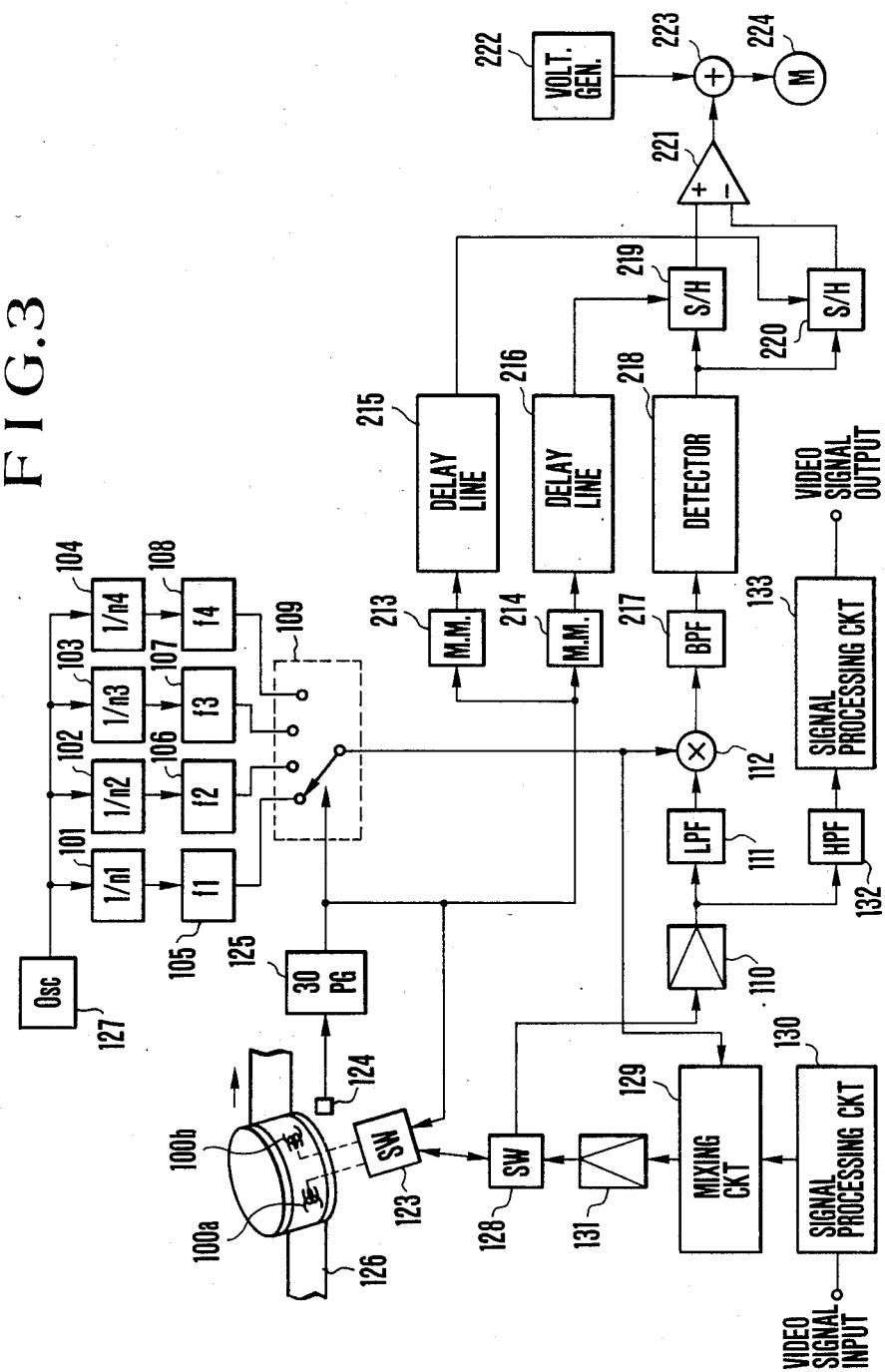
FIG. 3 is a block diagram showing the arrangement of a tracking control system of a VTR which is arranged according to this invention as an embodiment thereof.

FIG. 3 uses the same reference numerals in denoting the circuit elements which are the same as those shown in FIG. 2. The signal reproduced by rotary heads 100a and 100b which serve as reproducing means is amplified by the amplifier 110. The amplified signal is applied to the high-pass filter (HPF) 132 to have a frequency component of the band of the video signal separated. The frequency component thus separated by the HPF 132 is processed by the signal processing circuit 133 and is produced therefrom as a reproduced video signal.

Meanwhile, the low-pass filter (LPF) 111 is arranged to extract the pilot signals of four different frequencies which are within a low frequency band. The pilot signals thus reproduced are then multiplied at the multiplier 112 by reference signals which are produced in the same manner as in the case of FIG. 2 jointly by the reference signal oscillator (OSC) 127, frequency dividers 101, 102, 103 and 104, band-pass filters (BPF) 105, 106, 107 and 108 and the switch 109. By this process, difference $\Delta fa$ and $\Delta fb$ are obtained. The output of the multiplier 112 is then allowed to pass through a band-pass filter (BPF) 217 which has a frequency pass band having either the difference frequency $\Delta fa$ or $\Delta fb$ in the middle thereof and a detector 218. By that process, a cross-talk level is detected for every track.

However, at some instant, only the difference frequency signal $\Delta fa$ which is based on the pilot signal of one of the two tracks adjacent to the track being mainly traced by the rotary head is alone obtainable. On such an occasion, it becomes hardly possible to compare the cross-talk levels of the left and right sides. Therefore, the embodiment has a differential amplifier 221 arranged to compare the left and right signals after they have been passed through sample-and-hold circuits 219 and 220 which are arranged to operate at different sampling timings from each other. The signal of the left side is always stored by the sample-and-hold circuit 219 and the signal of the right side by the other sample-and-hold circuit 220. Therefore, the output of the differential amplifier 221 which is serving as comparison means includes therein also information on the direction of the tracking error without any additional process.

A capstan motor 224 can be controlled by means of the output of this differential amplifier 221 via an adder 223 without allowing it to pass through any phase inverter or the like. Further, a constant driving voltage generating circuit 222 is arranged to produce a control voltage for driving the motor to operate at a constant speed.

Figure 4:
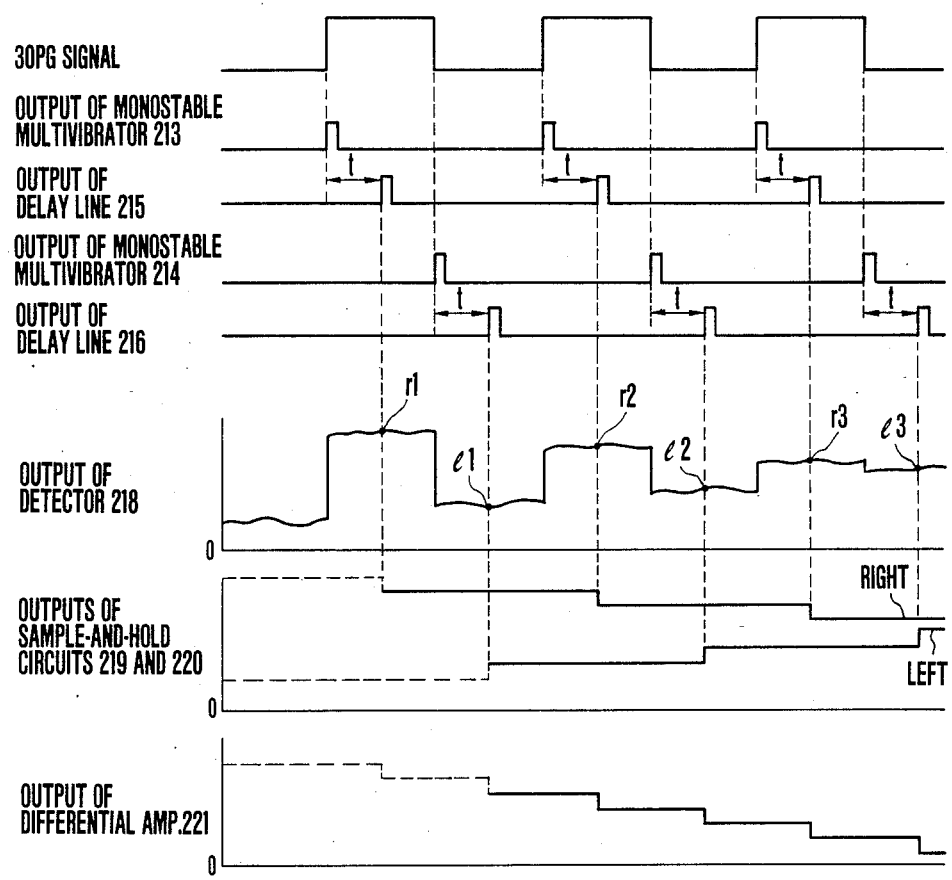
FIG. 4 is a timing chart showing the rnterrelation between operations of circuit elements essential to the tracking control system shown in FIG. 3.

Referring now to FIG. 4 in conjunction with FIG. 3, the timing for the above-stated sampling operation is as follows: In the signal produced from the detector 218, there are mixed the cross-talk components which are derived from the tracks on the left and right sides of the track mainly traced by the rotary head. Therefore, this signal output of the detector 218 is sampled alternately by their middle points (r1—r3 and l1—l3) as shown in FIG. 4. The cross-talk component derived from the right side track and the cross-talk components derived from the left side track then can be separated from each other by the alternate sampling. The above-stated middle points are obtained by detecting the edges of these cross-talk components by means of monostable multivibrators 213 and 214 with reference to the 30 PG signal produced from the 30 PG signal oscillator 125 and then by delaying them, through delay lines 215 and 216, for a peroid of time time "t" as shown in FIG. 4. However, for the above-stated alternate sampling operation, a sampling pulse is applied to the sample-and-hold circuit 220, which is for the cross-talk component derived from the right side track, by triggering the monostable multivibrator 213 at the rise of the 30 PG signal, while a sampling pulse for the sample-and-hold circuit 219, which is for the cross-talk component derived from the left side track, is applied by triggering the monostable multivibrator 214 at the fall of the 30 PG signal.

Further, the signal output of the differential amplifier 221 indicates that the control signal is renewed at every half period of the 30 PG signal. In other words, a new ATF error signal voltage is obtained for every track.

With the embodiment arranged to use only one difference frequency in the manner as described above, it suffices to use only one band-pass filter 217 and only one detector 218. This obviates the necessity of use of the other filter, the phase inverter 118, the electronic switch 119 of FIG. 2. The circuit arrangement of the prior art shown in FIG. 2 can thus be simplified. In addition to that, the adjustment operation on the center frequency, an offset voltage, which is necessary in accordance with the arrangement of the prior art also becomes unnecessary.

In accordance with this invention, the method for generating the sampling pulses is not limited to the above-stated method employed in the specific embodiment described and various other methods are conceivable. For example, the value "t" mentioned in the foregoing may be set at any other desired point within the field in carrying out the sampling operation. Further, the same effect is obtainable by holding a previous value or by allowing the output of the detector to pass without restriction until a sampling pulse value produced during the delay period comes to be held.

Further, the circuit arrangement likewise can be simplified without recourse to the sample-and-hold circuit but by a different arrangement wherein: The detection outputs obtained, respectively, while the 30 PG signal is at a high level and while it is at a low level are separately taken out; and these outputs are then compared through low-pass filters, respectively.

What is claimed is:

1. A reproducing apparatus, for reproducing information signals from a record bearing medium having a plurality of kinds of pilot signals with different frequencies from each other reocrded together with the information signals in adjacent recording tracks of a plurality of recording tracks, comprising:
   (a) reproducing means for reproducing at least a part of the pilot signals out of said plurality of kinds of pilot signals by tracing said record bearing medium;
   (b) detection signal generating means for generating a plurality of kinds of detection signals relative to second pilot signals and having different frequency components from each other by using the pilot signals reproduced by said reproducing means; and
   (c) tracking error signal generating means for generating a tracking error signal by using only one kind of detection signal out of said plurality of kinds of detection signals.

2. A reproducing apparatus according to claim 1, wherein said detection signal generating means includes:
   (a) reference signal generating means for generating a base reference signal;
   (b) frequency dividing means for generating a plurality of reference signals having frequencies corresponding to the frequency of said plurality of kinds of pilot signals by dividing the frequency of said base reference signal;
   (c) output means for alternatively outputting said reference signals in association with a tracing operation of said reproducing means; and
   (d) multiplication means for multiplying the pilot signal reproduced by said reproducing means with the reference signal outputted from said output means.

3. A reproducing apparatus according to claim 1, wherein said tracking error signal generating means includes:
   (a) separation means for separating only one kind of detection signal from said plurality of kinds of detecting signals generated by said detection signal generating means;
   (b) sample and hold means for generating a plurality of comparison signals by sampling and holding the detection signals separated by said separation means at a plurality of different timings; and
   (c) comparison means for generating said tracking error signal by comparing said plurality of comparison signals with each other, 4. An information signal reproducing apparatus, for carrying out, at the time of reproduction of an information signal, tracking control of a recording medium having a plurality of kinds of pilot signals with different frequencies from each other recorded together with the information signals in adjacent recording tracks of a plurality of recording tracks by using said pilot signals, comprising:
   (a) reproducing means for reproducing at least a part of the pilot signals out of said plurality of kinds of pilot signals by tracing said record bearing medium;
   (b) detection signal generating means for generating a plurality of kinds of detection signals associated with said pilot signals and having different frequency components from each other by using the pilot signals reproduced by said reproducing means;
   (c) sampled signal generating means for generating a plurality of sampled signals by sampling and holding a kind of detection signal out of said plurality of kinds of detection signals at different timings;

(d) tracking error signal generating means for generating a tracking error signal by using said plurality of sampled signals; and (e) tracking control means for the control of the tracking according to said tracking signal.

5. An information signal reproducing apparatus according to claim 4, wherein said detection signal generating means includes a reference signal generating means for generating a reference signal having a frequency corresponding to said pilot signal and is designed so as to generate said plurality of kinds of detection signals corresponding to the deviation between the trace of said reproducing means and said recording track by using said pilot signal and said reference signal.

6. An information signal reproducing apparatus according to claim 4, wherein said sampled signal generating means including timing signal generating means for generating a plurality of timing signals having different timings, and delay means for delaying said timing signals.

7. An information signal reproducing apparatus according to claim 6, wherein said timing signal generating means includes synchronization signal generating means synchronized with the tracing frequency of each recording track by said reproducing means.

8. An information signal reproducing apparatus according to claim 4, wherein said tracking error signal generating means includes comprison means for comparing said plurality of sampled signals so as to generate a tracking error signal.

9. A reproducing apparatus, for reproducing information signals from a record bearing medium having a plurality of kinds of pilot signals with different frequencies from each other recorded in adjacent recording tracks of a plurality of recording tracks together with said information signal, comprising:

(a) reproducing means for reproducing at least a part of the pilot signals out of the plurality of kinds of pilot signals recorded in said plurality of recording tracks by tracing said record bearing medium;

(b) reference signal generating means for generating reference signals having frequencies corresponding to the pilot signals recorded in said plurality of recording tracks;

(c) detection signal generating means for generating a plurality of kinds of detection signals each relative to the deviation of the tracks to be controlled in tracking from the trace of said reproducing means and having different frequencies from each other by using the pilot signals reproduced by said reproducing means and the reference signals generated by said reference signals generated by said reference signal generating means; and (d) tracking error signal generating means for generating a tracking error signal by using only one kind of detection signal out of said plurality of kinds of detection signals.

10. A reproducing apparatus according to claim 9. wherein said tracking error signal generating means includes separation means for separating only the detection signal with one frequency component from said plurality of kinds of detection signals.

11. A reproducing apparatus according to claim 10, wherein said tracking error signal generating means further includes comparison means for generating the tracking error signal by comparing the detection signal with one frequency component separated by said separation means at each tracing of said record bearing medium by said reproducing means.

12. A reproducing apparatus, for reproducing video signals from a magnetic tape having a plurality of kinds of pilot signals with different frequencies from each other recorded together with said video signal in adjacent tracks of a plurality of helical recording tracks, comprising:

(a) a rotary magnetic head for reproducing at least a part of the pilot signals of the plurality of kinds of pilot signals recorded in said plurality of the helical recording tracks by tracing said magnetic tape;

(b) reference signal generating means for generating reference signals having frequencies corresponding to the pilot signals recorded in said plurality of helical recording tracks;

(c) detection signal generating means for generating a plurality of kinds of detection signals each relative to the deviation of the tracks to be controlled in tracking from the trace of said rotary magnetic and having different frequency components from each other by using the pilots signals reproduced by said rotary magnetic head and the reference signals generated by said reference signal generating means; and (d) tracking error signal generating means for generating a tracking error signal by using only one kind of the detection signals out of said plurality of detection signals.

13. A reproducing apparatus according to claim 12, wherein said rotary magnetic head means includes two magnetic head arranged at positions having a phase difference of 180° from each other.

14. A reproducing apparatus according to claim 13, wherein said reference signal generating means includes switch-over means for cyclically switching over said two magnetic heads wNen the heads.trace said magnetic tape alternatively, so as to generate a plurality of kinds of reference signals having different frequencies from each other.

15. A reproducing apparatus according to claim 13, wherein said tracking error signal generating means includes comprison means for comparing a kind of the detection signals out of a plurality of kinds of detection signals generated by said detection signal generating means by using the pilot signals reproduced by one rotary magnetic head out of said two rotary magnetic heads with the same kind of the detection signals as said one kind of the detection signals out of a plurality of kinds of the detection signals generated by said detection signal generating means by using the pilot signals generated by the other of said rotary magnetic heads.

16. A reproducing apparatus, for reproducing information signals from a record bearing medium having a plurality of kinds of pilot signals with different frequencies from each other recorded together with said information signals in adjacent recording tracks out of a plurality of recording tracks, comprising:

(a) two reproducing means each for reproducing at least one pilot signal out of said plurality of kinds of pilot signals by tracing said record bearing medium;

(b) reference signal generating means for generating reference signals having frequencies corresponding to the pilot signals recorded in said plurality of recording tracks;

(c) detection signal generating means for generating a plurality of kinds of detecting signals each relative to deviation of the tracks to be controlled in tracking from the traces of said two reproducing means and having different frequency components from each other, by using the pilot signals generated by said two reproducing means and the reference signal generated by said reference signal generating means; and (d) tracking error signal generating means for generating a tracking error signal by using one kind of the detection signals out of a plurality of kinds of detection signals generated by said detection signal generating means by using the pilot signals reproduced by one reproducing means of said two reproducing means and the same kind of detection signals as said kind of the detection signals out of a plurality of kinds of the detection signals generated by said detection signals generating means by using the pilot signal reproduced by the other of said reproducing means.

17. A reproducing apparatus according to claim 16, wherein said two reproducing means are arranged to trace said record bearing medium alternatively.

18. A reproducing apparatus according to claim 17, wherein said two reproducing means includes two rotary magnetic heads arranged at positions having a phase difference of 180° from each other.

19. A reproducing apparatus according to claim 17, wherein said reference signal generating means includes switching means for generating a plurality of kinds of reference signals with different frequencies by cyclically switching over said two reproducing means every time when said two reproducing means traces said record bearing medium alternatively.

20. A reproducing apparatus according to claim 16, wherein said detection signal generating means is arranged to generate a first detection signal and a second detection signal with different frequency components.

21. A reproducing apparatus according to claim 44, wherein said tracking error signal generating means includes comparison means for comparing said first detection signal, generated by said detection signal generating means by using the pilot signal reproduced by the one reproducing means out of said two reproducing means, with the second detection signal, generated by said detection signal generating means by using the pilot signal generated by the other reproducing means, as so to output a tracking error signal corresponding to the comprison result.

22. A reproducing apparatus, for reproducing information signals from a record bearing medium having pilot signals with different frequencies from each other recorded together with said information signals in adjacent recording tracks of a plurality of recording tracks, comprising:

(a) reproducing means for reproducing at least a part of the pilot signals out of said plurality of kinds of pilot signals by tracing said record bearing medium;

(b) reference signal generating means for generating a plurality of kinds of reference signals with different frequencies from each other sequentially at a certain predetermined rotation every time when said reproducing means traces said record bearing medium;

(c) detection signal generating means for generating a plurality of kinds of detection signals having different frequencies from each other by using a pilot signal reproduced by said reproducing means and a reference signal generated by said reference signal generating means; and (d) tracking error signal generating means for generating a tracking error signal from a kind of detection signal out of said plurality of kinds of detection signals.

23. A reproducing apparatus according to claim 22, wherein said reference signal generating means includes switch over means for switching over the synchronization signal generating means which generate synchronization signals corresponding to the frequency at which said reproducing means traces said record bearing medium, so as to generate said plurality of kinds of reference signals.

24. A reproducing apparatus according to claim 23, wherein said synchronization signal generating means is arranged so as to generate a synchronization signal whose plurality of inversed at said frequency by detecting the period in which said reproducing means traces said record bearing medium.

* * * * *